United States Patent [19]

Moody et al.

[11] Patent Number: 5,012,902
[45] Date of Patent: May 7, 1991

[54] CALIPER AND RETAINING PIN SPACER

[75] Inventors: Mark D. Moody; Robert T. DuCharme, both of South Bend, Ind.

[73] Assignee: Allied-Signal Inc., Morristown, N.J.

[21] Appl. No.: 414,803

[22] Filed: Sep. 29, 1989

[51] Int. Cl.$^5$ .............................................. F16D 65/02
[52] U.S. Cl. ............................. 188/73.35; 188/73.44; 188/73.45
[58] Field of Search ............... 188/73.33, 73.34, 73.35, 188/73.36, 73.44, 73.45

[56]  References Cited

U.S. PATENT DOCUMENTS

| | | | |
|---|---|---|---|
| 3,421,602 | 1/1969 | Craske | 188/73 |
| 3,677,372 | 7/1972 | Burnett | 188/73.3 |
| 3,841,446 | 10/1974 | Gravel, Jr. | 188/83.5 |
| 4,034,857 | 7/1977 | Kondo et al. | 188/73.3 |
| 4,134,477 | 1/1979 | Asquith | 188/73.44 X |
| 4,171,037 | 10/1979 | Souma et al. | 188/73.5 |
| 4,219,105 | 8/1980 | Delauney | 188/73.5 |
| 4,244,451 | 1/1981 | Johannesen | 188/73.3 |
| 4,245,723 | 1/1981 | Moriya | 188/72.3 |
| 4,393,963 | 7/1983 | Oltmanns, Jr. et al. | 188/73.45 |
| 4,469,205 | 9/1984 | Stoka et al. | 188/234 |
| 4,574,922 | 3/1986 | Varin et al. | 188/73.35 |

FOREIGN PATENT DOCUMENTS

| | | | |
|---|---|---|---|
| 135976 | 10/1979 | Japan | 188/73.45 |
| 155341 | 7/1987 | Japan | 188/73.45 |

Primary Examiner—George E. A. Halvosa
Attorney, Agent, or Firm—Larry J. Palguta; Ken C. Decker

[57] ABSTRACT

The spacer (50) comprises a generally C-shaped member which is disposed about a complementary shaped pin (40) which connects a caliper housing (12) to a torque support member (16) of a disc brake (10). The pin (40) has radially opposite flat side portions (42, 44) connected by curved surfaces (46, 48). The spacer (50) includes a pair of oppositely disposed and axially spaced apart upper flanges (58) at opposite ends of a bowed upper portion (54), and axially spaced apart lower flanges (60) which are bent axially inwardly toward one another. Each of the lower flanges (60) has a corner ear (62) adjacent a curved portion (52) of the spacer (50) which are bent outwardly away from one another. Adjacent the ears (62) where the lower flanges (60) engage the curved portion (52) are axially opposite notches (64) which prevent stress cracking of the spacer (50).

4 Claims, 2 Drawing Sheets

CALIPER AND RETAINING PIN SPACER

The present invention relates generally to a spacer member utilized between an opening of a caliper housing and a retaining pin which secures the caliper to a torque support member of a disc brake.

Mono-pin disc brakes have been provided for use on vehicles and offer the advantage of easy serviceability of the disc brakes. The caliper, which is mounted by means of a single pin to the torque support member, is merely detached at one circumferential side from the torque support member and pivoted about the pin so that easy access is provided to the brake shoes and other parts of the disc brake. This makes servicing the disc brake pads very easy. Typically, the caliper housing is connected with the torque support member by a resilient snap-together engagement, pin means, or other suitable devices, such as illustrated in U.S. Pat. Nos. 4,533,023; 4,533,025; and 4,588,051. When a pin is utilized to connect the caliper housing with the torque support member, it is desirable to provide a connection which does not permit undue dynamic movement between the caliper housing, pin, and torque member, and which also dampens vibrations caused by external mechanisms. It is highly desirable to provide a caliper, pin, and torque support member connection which reduces the rate of wear between the various parts as a result of reducing dynamic movement and dampening vibration.

The present invention provides a solution to the above problems by providing a spacer positioned between a caliper housing and a retaining pin which connects the caliper housing with a torque support member of a disc brake, the caliper housing having an axially extending opening receiving therein pin means connected with said torque member, the pin means shaped complementary with the caliper housing opening, the spacer comprising a generally C-shaped member with a curved portion connecting together upper and lower portions having respective upper and lower flanges, the upper flanges extending axially and slightly outwardly from the upper portion of the spacer, the upper portion being bowed inwardly toward a center area of the spacer member, the lower flanges of the lower portion extending substantially away from a center portion of the C-shaped member and bent inwardly toward one another so as to grip adjacent portions of the caliper housing, each of the lower flanges having a corner ear adjacent the curved portion which is bend axially outwardly away from the other ear, and the spacer member disposed within the caliper housing opening and about the pin member in order to reduce dynamic movement and dampen vibration therebetween.

One way of carrying out the invention is described in detail with reference to the drawings which illustrate an embodiment in which.

Figure 1:
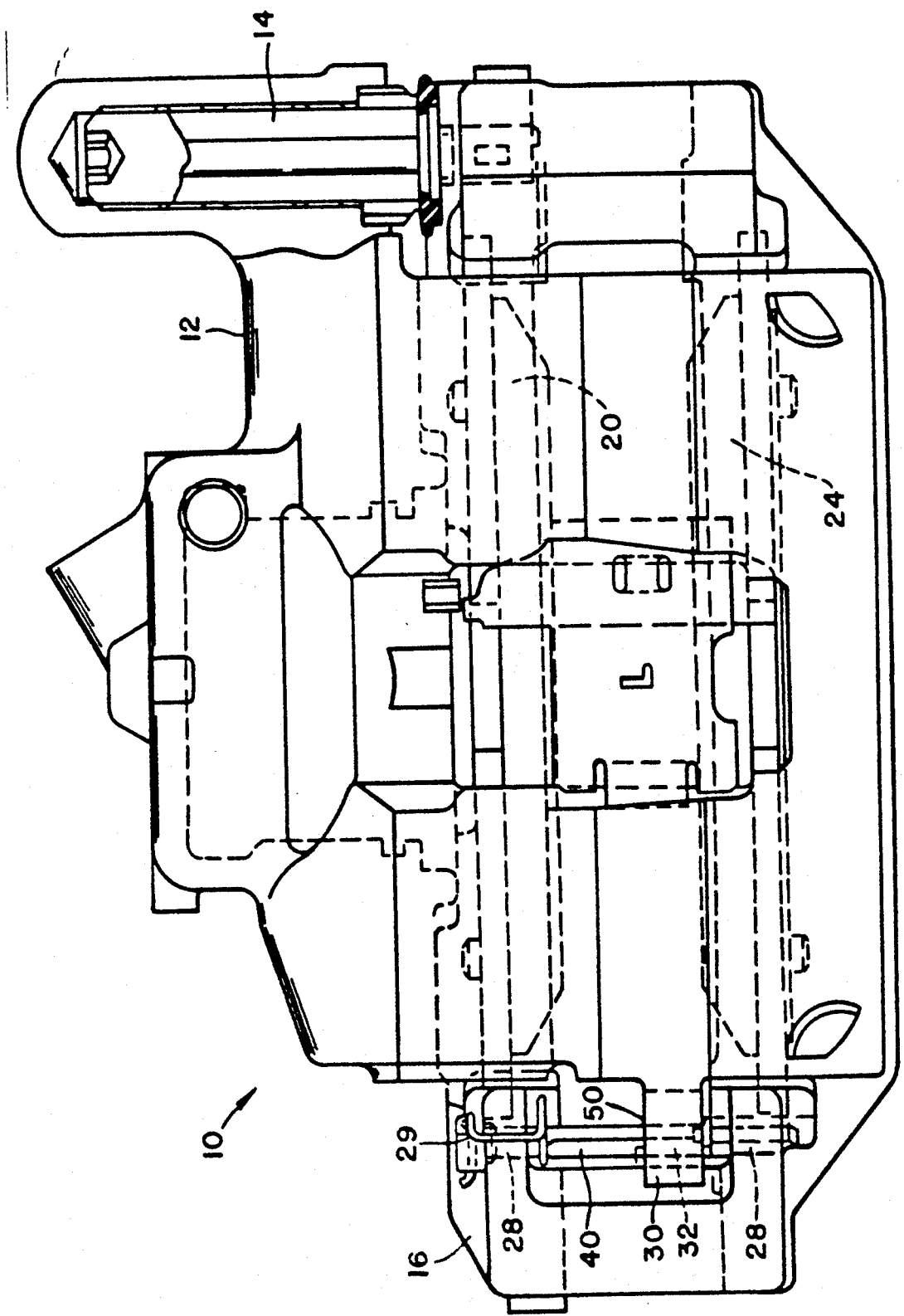
FIG. 1 is a view of a mono-pin disc brake utilizing a spacer of the present invention.
Figure 2:
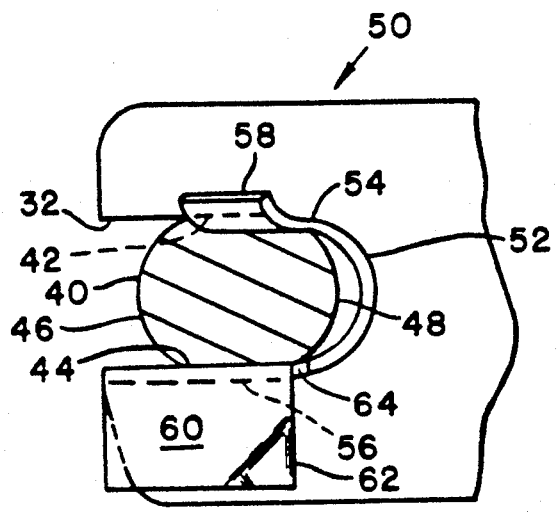
FIG. 2 is a partial section view illustrating the connection between the caliper housing, pin, and spacer.

FIG. 1 illustrates a mono-pin disc brake generally indicated by reference numeral 10. Mono-pin disc brake 10 comprises a caliper 12 which is attached by means of pin 14 with a torque support member 16. Caliper housing 12 houses a fluid operated piston (not shown) which displaces an inner brake pad 20 into engagement with a rotor (not shown) which, by reaction, causes displacement of the caliper housing 12 along pin 14 to bring outer brake pad 24 into engagement with the opposite side of the rotor, as is well known in the art. Caliper housing 12 includes a caliper arm 30 which includes an opening 32 receiving therein spacer 50 and pin 40. Pin 40 is received within torque support member openings 28 and fixed thereto by means of wire retainer 29. As illustrated in FIG. 2, pin 40 has a generally double C-shaped central portion wherein opposing radial side portions 42 and 44 are flat shaped and connect together the curved end surfaces 46 and 48. Pin 40 is shaped complementary with caliper opening 32.

Figure 3:
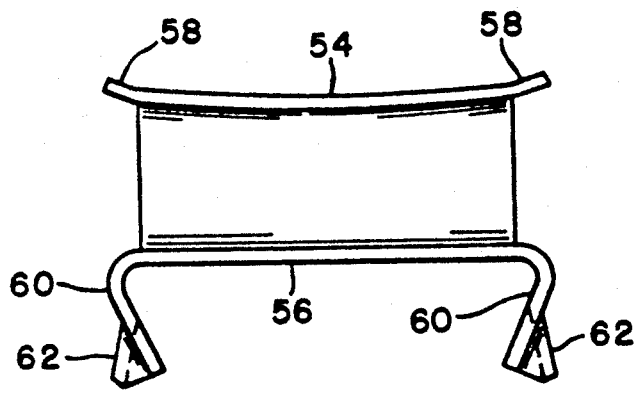
FIG. 3 is an end view of the spacer of the present invention.
Figure 4:
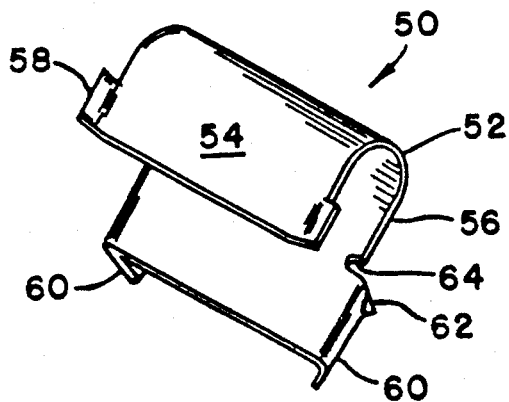
FIG. 4 is an isometric view of the spacer.

If an appropriate connection is not provided between caliper housing 12, pin 40 and torque support member 16, dynamic movement between the parts and vibrations caused by external means will result in undue wear of caliper housing opening 32, pin 40, torque support openings 28, and torque member 16. In order to prevent this, spacer 50 is provided in accordance with the present invention. Spacer 50 comprises a generally C-shaped member having a center or curved portion 52 connecting together a radially upper portion 54 and a radially lower portion 56. Radially upper portion 54 is generally bowed (see FIG. 3) toward a center area of the spacer and opposite axial ends have axially extending upper flanges 58. Upper flanges 58 assist in retaining axially spacer 50 within caliper opening 32. Lower portion 56 has at opposite axial ends a pair of axially inwardly spaced apart flanges 60, each of which are bent axially toward one another (see FIG. 3). Each flange 60 has a corner ear portion 62 adjacent the connection of lower portion 56 with curved portion 52, each corner ear 62 being bent axially outwardly away from one another. At the junction of lower flanges 60 and curved portion 52, are a pair of axially disposed apart notches 64 which prevent stress cracking of spacer 50.

Spacer 50 is inserted within caliper housing opening 32 such that when it slides into place the ear portions 62 do not bite into or interfere with adjacent portions of caliper arm 30 and prevent the spacer from being properly mounted in opening 32. The lower flanges 60 resiliently engage arm 30 in order to retain spacer 50 within opening 32. When caliper housing 12 is pivoted into operational position, pin 40 is inserted through torque support openings 28 and is received within spacer 50 as shown in FIG. 2. Wire retainer 29 is attached to pin 40 so that pin 40 is retained axially in place.

Spacer 50 reduces dynamic movements between caliper opening 32, pin 40, torque support member openings 28, and wire retainer 29. This significantly reduces the rate of wear between the parts, and also reduces such wear when vibrations are caused by external means. Vibrations caused by external means are dampened by the spacer member so that dynamic movements between the parts are minimized.

The spacer of the present invention provides an integral metallic member that is stamped from sheet metal and formed into shape by inexpensive manufacturing methods. It is easily inserted in the caliper housing for which it is provided, and receives easily the complementarily shaped pin which couples the caliper housing to the torque support member so that the caliper housing will not rotate radially outwardly from the rotor during braking.

We claim:

1. A spacer positioned between a caliper housing and pin means which connects the caliper housing with a torque support member of a disc brake, the caliper housing having an axially extending opening receiving therein the pin means connected with said torque member, the pin means shaped complementary with the caliper housing opening, the spacer comprising a generally C-shaped spacer member with a curved portion connecting together upper and lower portions having respective upper and lower flanges, the upper flanges extending axially outwardly from the upper portion of the spacer member to be axially outside the housing opening, the upper portion being bowed radially inwardly toward the pin and a center area of the spacer member, the lower flanges of the lower portion extending substantially radially away from a center portion of the C-shaped spacer member and bent axially inwardly toward one another so as to grip adjacent portions of the caliper housing, each of the lower flanges having a corner ear adjacent the curved portion and which is bent axially outwardly away from the respective lower flange and the other ear, the curved portion joined to the lower portion and lower flanges by means of axially opposite notches disposed in the spacer member in order to prevent stress cracking, and the spacer member disposed within the caliper housing opening and about the pin means in order to reduce dynamic movement and dampen vibration therebetween.

2. The spacer in accordance with claim 1, wherein said spacer is made from a stamped sheet metal plate.

3. The spacer in accordance with claim 2, wherein the pin means comprises radially upper and lower flat portions connected by curved end portions so that the pin means is shaped complementary with said spacer member, and the upper and lower portions of the spacer member engage the flat portions of the pin means.

4. The spacer in accordance with claim 3, wherein said ears are each bent outwardly at an angle relative to the respective lower flange so as to enable the spacer member to be positioned within the opening of the caliper housing without the ears interfering with said positioning.

* * * * *